(12) United States Patent
Cabello et al.

(10) Patent No.: US 11,053,863 B2
(45) Date of Patent: Jul. 6, 2021

(54) INTEGRATED FUEL PUMP AND CONTROL PRESERVATION SYSTEM

(71) Applicant: UNITED TECHNOLOGIES CORPORATION, Farmington, CT (US)

(72) Inventors: Brian Cabello, Windsor, CT (US); Michael Meagher, Tolland, CT (US); Steven S. Sperling, Somers, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 527 days.

(21) Appl. No.: 15/694,358

(22) Filed: Sep. 1, 2017

(65) Prior Publication Data
US 2019/0072041 A1    Mar. 7, 2019

(51) Int. Cl.
| F02C 9/26 | (2006.01) |
| F02C 7/232 | (2006.01) |
| F01D 25/00 | (2006.01) |
| F02C 7/32 | (2006.01) |
| H01H 9/16 | (2006.01) |

(52) U.S. Cl.
CPC ............ *F02C 9/263* (2013.01); *F01D 25/002* (2013.01); *F01D 25/007* (2013.01); *F02C 7/232* (2013.01); *F02C 7/32* (2013.01); *H01H 9/161* (2013.01); *F05D 2220/323* (2013.01); *F05D 2230/72* (2013.01); *F05D 2260/602* (2013.01); *F05D 2260/95* (2013.01)

(58) Field of Classification Search
CPC .... F01D 21/003; F01D 25/002; F01D 25/007; F02C 7/22; F02C 7/222; F02C 7/232; F02C 7/32; F02C 9/263; F05D 2230/72; F05D 2260/95; F05D 2260/602; F23K 5/18; F23K 2301/203
See application file for complete search history.

(56) References Cited

U.S. PATENT DOCUMENTS

| 3,591,962 | A | * | 7/1971 | Connell | ................... | F02C 7/272 |
| | | | | | | 60/776 |
| 4,041,696 | A | * | 8/1977 | Morrison | .................. | F02C 7/26 |
| | | | | | | 60/790 |
| 4,697,238 | A | * | 9/1987 | Barbeau | .................... | F02C 7/22 |
| | | | | | | 60/243 |

(Continued)

FOREIGN PATENT DOCUMENTS

| IL | 198606 | 4/2012 |
| SU | 830720 | 1/1996 |

OTHER PUBLICATIONS

Lightbody "Aircraft Gas Turbine Electronic Engine Controllers (EEC)" (Year: 2014).*

(Continued)

*Primary Examiner* — Arun Goyal
*Assistant Examiner* — William L Breazeal
(74) *Attorney, Agent, or Firm* — Snell & Wilmer L.L.P.

(57) ABSTRACT

A portable fuel preservation system is disclosed. The portable fuel preservation system may comprise a switch box configured to be coupled to an integrated fuel pump and control of a gas turbine engine. The switch box may comprise a circuit configured to cause a metering valve and a solenoid valve of the integrated fuel pump and control to open. A driver may be configured to inject preservation fluid into the integrated fuel pump and control.

13 Claims, 5 Drawing Sheets

(56) References Cited

U.S. PATENT DOCUMENTS

| | | | | |
|---|---|---|---|---|
| 6,882,924 | B2* | 4/2005 | Miller | F02C 9/263 |
| | | | | 477/30 |
| 7,237,535 | B2* | 7/2007 | Eick | F02C 7/22 |
| | | | | 123/478 |
| 2013/0032215 | A1 | 2/2013 | Streifinger | |
| 2015/0354404 | A1* | 12/2015 | Ekanayake | C11D 3/162 |
| | | | | 60/785 |
| 2016/0349762 | A1 | 12/2016 | Girard | |

OTHER PUBLICATIONS

European Patent Office, European Search Report dated Dec. 14, 2018 in Application No. 18191482.1.
European Patent Office, European Office Action dated Nov. 9, 2020 in Application No. 18191482.1.
Powervamp Ltd, "Aviation Ground Power Products and Services", Jan. 31, 2013 (Jan. 31, 2013), pp. 1-36, XP0557 46446, Retrieved from the Internet: URL:http://www.gelbyson.com/documenti/new/powervamp/Gelbsyon-Powervamp_Brochure2012_Aviazione.pdf, retrieved on Nov. 3, 2020.

* cited by examiner

INTEGRATED FUEL PUMP AND CONTROL PRESERVATION SYSTEM

FIELD

The present disclosure relates generally to maintenance of gas turbine engines and, more specifically, to a preservation system for a fuel system of a gas turbine engine.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

For various reasons, it may be necessary to remove a gas turbine engine from an aircraft and store the engine for an extended period of time. In preparation for a period of inactivity, the fuel must be flushed out the gas turbine engine and replaced with a preservation fluid that protects the fuel system to prevent corrosion or other damage. Current preservation systems tend to inject the preservation fluid while the engine is attached to the aircraft or is in an engine test cell, such that the aircraft or test cell provides power to drive various systems of the engine during injection of the preservation fluid. Conducting the preservation of the fuel system while the engine remains attached to an aircraft or is in a test cell tends to increase costs due to the time the engine occupies the aircraft or test cell.

SUMMARY

A switch box for a portable fuel preservation system is disclosed, in accordance with various embodiments. The switch box may comprise a mating connector configured to engage a pin interface of an integrated fuel pump and control. A circuit may be electrically coupled to the mating connector. The circuit may comprise a power supply electrically coupled to a first pin of the mating connector. The first pin of the mating connector may be configured to engage a second pin of the pin interface. The second pin may be electrically connected to a metering valve of the integrated fuel pump. A resistor may be coupled between the power supply and the first pin.

In various embodiments, the power supply may comprise a 28 volt power supply. A mechanical switch may be configured to open and close the circuit. An indicator light may be configured to illuminate when the circuit is at least one of closed or open.

In various embodiments, the power supply and the resistor may generate between a 10 milliamp and 50 milliamp current. The resistor may comprise a one kilo-ohm resistor. In various embodiments, the resistor may comprise a potentiometer.

A portable fuel preservation system is disclosed, in accordance with various embodiments. The portable fuel preservation system may comprise a switch box and a driver. The switch box may be configured to be coupled to an integrated fuel pump and control of a gas turbine engine, and cause a metering valve of the integrated fuel pump and control and a solenoid valve of the integrated fuel pump and control to open and close. The driver may be configured to inject preservation fluid into the integrated fuel pump and control.

In various embodiments, the switch box may comprise mating connector configured to engage a pin interface of the integrated fuel pump and control, and a circuit electrically coupled to the mating connector. The circuit may comprise a power supply electrically coupled to a first pin of the mating connector. The first pin of the mating connector may be configured to engage a second pin of the pin interface. The second pin may be electrically connected to the metering valve of the integrated fuel pump.

In various embodiments, the circuit may comprise a resistor coupled between the power supply and the first pin. The circuit may generate a current between 10 milliamp and 50 milliamp to open the metering valve of the integrated fuel pump. The resistor may comprise a one kilo-ohm resistor.

In various embodiments, the circuit may supply a voltage configured to actuate the metering valve. The switch box may further comprise an indicator light configured to illuminate when the circuit is at least one of open or closed.

A method of preserving a fuel system of a gas turbine engine is disclosed, in accordance with various embodiments. The method may comprise coupling a switch box of a portable fuel preservation system to an integrated fuel pump and control of the gas turbine engine, opening a metering valve of the integrated fuel pump and control using a current generated by closing a circuit of the switch box, and injecting a preservation fluid into the fuel system.

In various embodiments, coupling the switch box to the integrated fuel pump and control may comprise engaging a mating connector coupled to the switch box with a pin interface of the integrated fuel pump and control. A first pin of the mating connector may be electrically coupled to the circuit. The circuit may comprise a power supply electrically coupled to the first pin of the mating connector. The first pin of the mating connector may be configured to engage a second pin of the pin interface. The second pin may be electrically connected to the metering valve of the integrated fuel pump. A resistor may be coupled between the power supply and the first pin. The resistor may comprise a one kilo-ohm resistor. The current generated by closing the circuit of the switch box may be between 10 milliamp and 50 milliamp. Opening the metering valve may cause a first solenoid valve and a second solenoid valve of the integrated fuel pump and control to open.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

Figure 1:
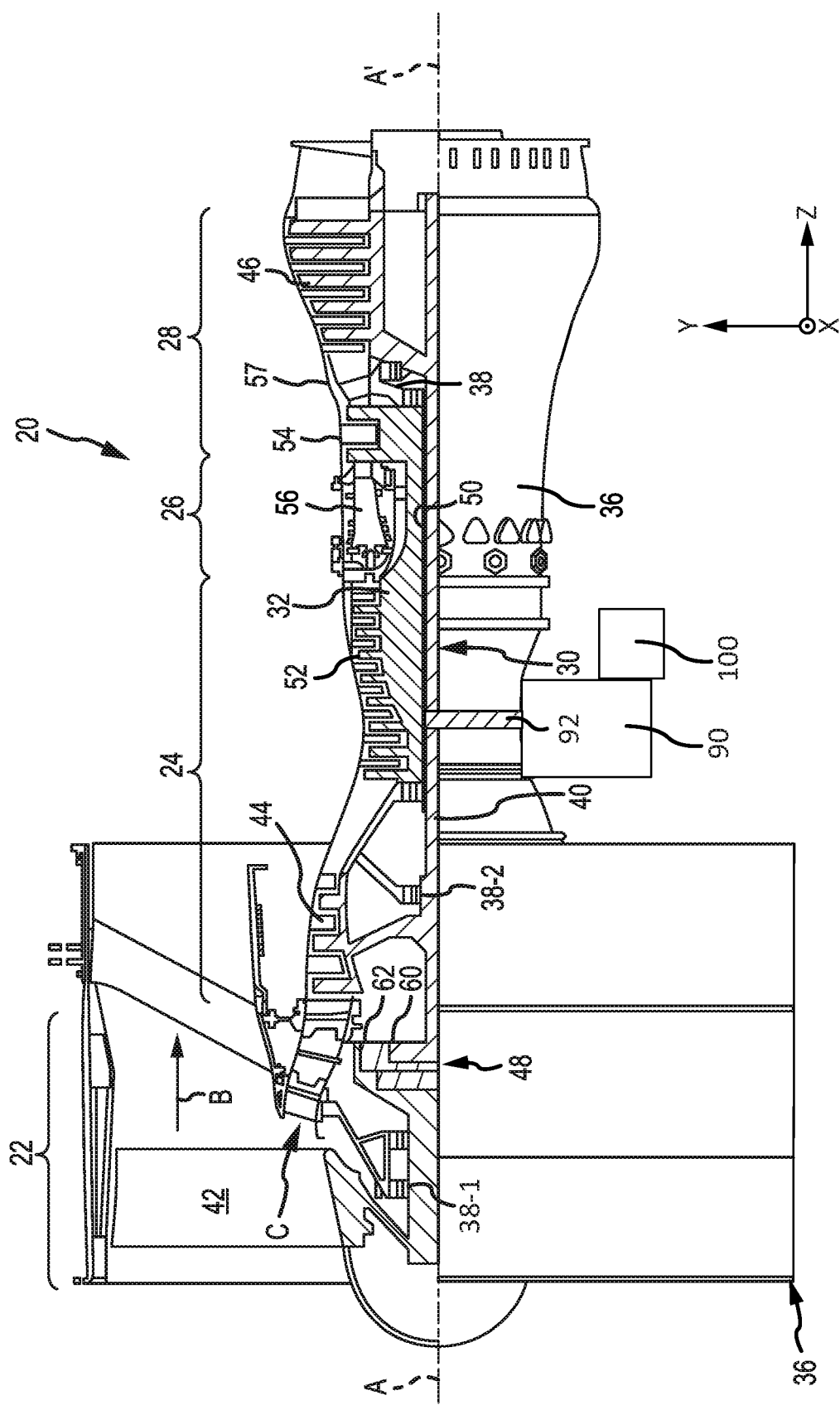
FIG. 1 illustrates a cross-section view of an exemplary gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a path of core airflow C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

An accessory gearbox 90 may be mechanically coupled to gas turbine engine 20. In various embodiments, accessory gearbox 90 may be mechanically coupled to outer shaft 50 via a tower shaft 92. Accessory gearbox 90 may extract power from gas turbine engine 20 in order to drive one or more accessories of gas turbine engine 20 and/or of the aircraft to which gas turbine engine 20 may be mounted. For example, gas turbine engine 20 may comprise one or more interfaces for transferring power extracted from outer shaft 50 to one or more component of, for example, a fuel system 100 of gas turbine engine 20.

Figure 2:
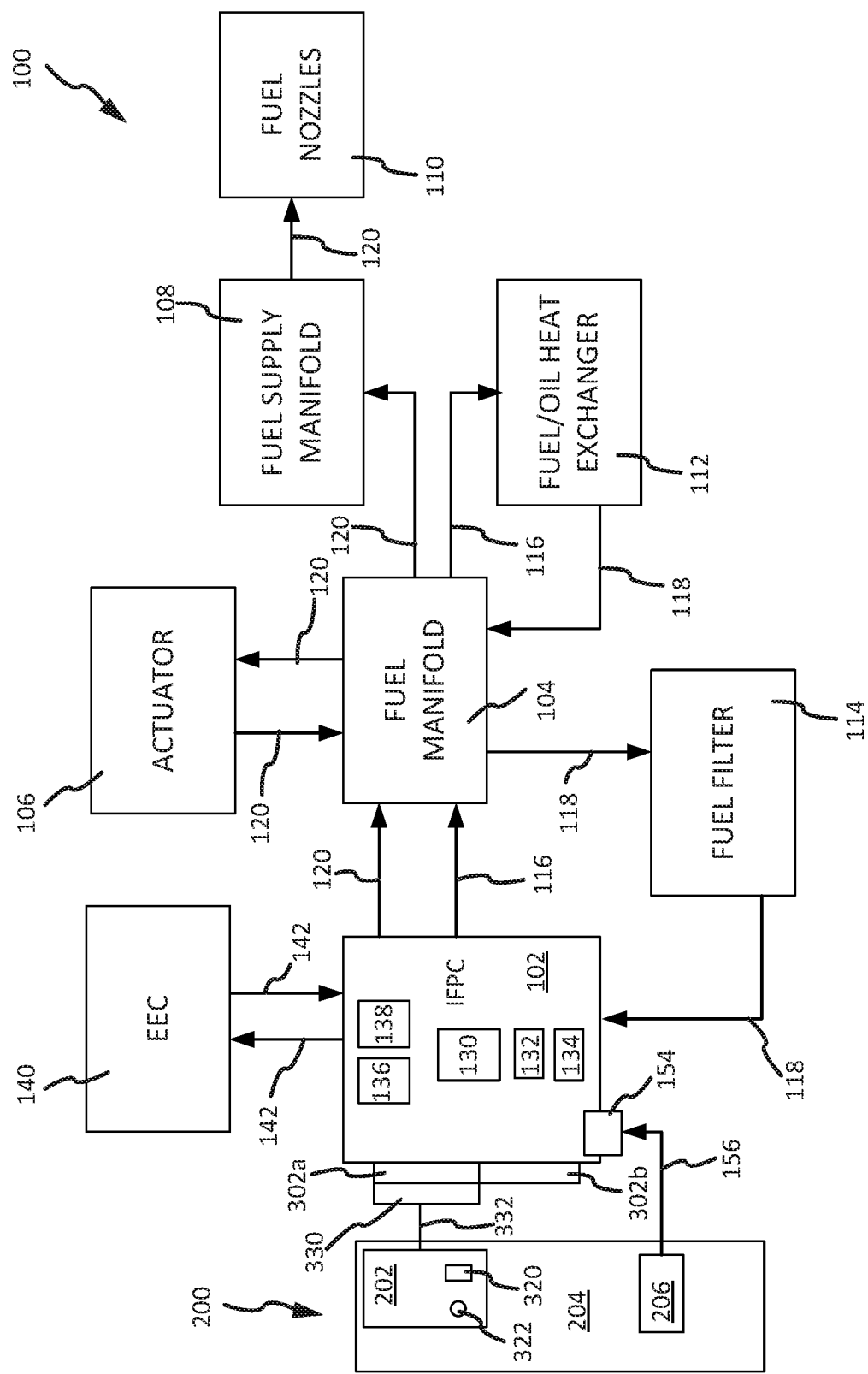
FIG. 2 illustrates a schematic of a fuel preservation system coupled to a fuel system of a gas turbine engine, in accordance with various embodiments.

With reference to FIG. 2, a schematic illustration of fuel system 100 in combination with a portable fuel preservation system 200 for injecting preservation fluid into fuel system 100 is shown, in accordance with various embodiments. Fuel system 100 may comprise an integrated fuel pump and control (IFPC) 102, a fuel manifold 104, an actuator 106, a fuel supply manifold 108, fuel nozzles 110, a fuel/oil heat exchanger 112, and a fuel filter 114. The components of fuel system 100 may be fluidly coupled to one another via cold fuel conduits 116 and warm fuel conduits 118 and 120. For example, cold fuel may flow from IFPC 102 to fuel/oil heat exchanger 112 via fuel supply manifold 108 and cold fuel conduits 116. Fuel/oil heat exchanger 112 may warm the cold fuel received from fuel supply manifold 108, and the warmed fuel may be returned to IFPC 102 via fuel supply manifold 108, fuel filter 114, and warm fuel conduits 118. IFPC 102 may then distribute the warmed fuel to the other components of fuel system 100 (e.g., actuator 106, fuel nozzles 110, etc.) via warm fuel conduits 120.

IFPC 102 may be configured to regulate the volume of fluid (e.g., the cool and/or warm fuel) dispensed to the other components of fuel system 100. In that regard, IFPC 102 may comprise one or more valves for controlling the flow of fluid to and from the components of fuel system 100. In various embodiments, IFPC 102 may comprise a fuel metering valve 130, an overspeed solenoid valve 132, and a pressure equalization solenoid valve 134. The opening and closing of fuel metering valve 130, overspeed solenoid valve 132, and pressure equalization solenoid valve 134 may regulate the flow of liquid through fuel system 100.

An electronic engine controller (EEC) 140 may be electrically coupled to IFPC 102 via communication channels (e.g., wires or cables) 142. EEC 140 may be configured to make decisions regarding the control and operation of engine 20. EEC 140 may be part of a Full Authority Digital Engine Control (FADEC). EEC 140 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

EEC 140 may comprise system program instructions and/or controller instructions that may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

EEC 140 may be configured to provide optimum engine efficiency by controlling aspects of operation of fuel system 100. In various embodiments, EEC 140 may be in operable communication with IFPC 102. For example, EEC 140 may receive fuel temperature data output from one or more resistance temperature detector(s) (RTD) 136 within IFPC 102. EEC 140 may receive data related to the position of metering valve 130 from one or more linear variable differential transformer(s) (LVDT) 138 within IFPC 102. EEC may output commands to IFPC 102, for example, commands relating to the opening and closing of valves 130, 132, and/or 134, in response to data received from IFPC 102 and/or in response to other engine operating data. In that regard, metering valve 130 and solenoid valves 132 and 134 may be configured such that, during various stages of operation, certain valves may opened while other valves may be closed, thereby regulating both which components of fuel system 100 receive fluid and the volume of fluid received.

During preservation of fuel system 100, it may be desirable for all valves of IFPC 102 to be opened such that preservation fluid may flow to and cover various components of fuel system 100 that are in need of preservation. In that regard, a switch box 202 of portable fuel preservation system 200 may be coupled to a first input/output pin interface 302a of IFPC 102 to generate an actuation of metering valve 130. The actuation of metering valve 130 by switch box 202 may also cause solenoid valves 132 and 134 to open. Actuation of metering valve 130 and solenoid valves 132 and 134 may permit the flow of preservation fluid through the various components of fuel system 100. In various embodiments, switch box 202 of portable fuel preservation system 200 may cause valves in IFPC 102 and in various components throughout fuel system 100 that would not be opened together during engine operating conditions to open. Opening valves which are not normally opened at the same time may allow for preservation fluid to flow more freely and quickly through fuel system 100.

Figure 3:
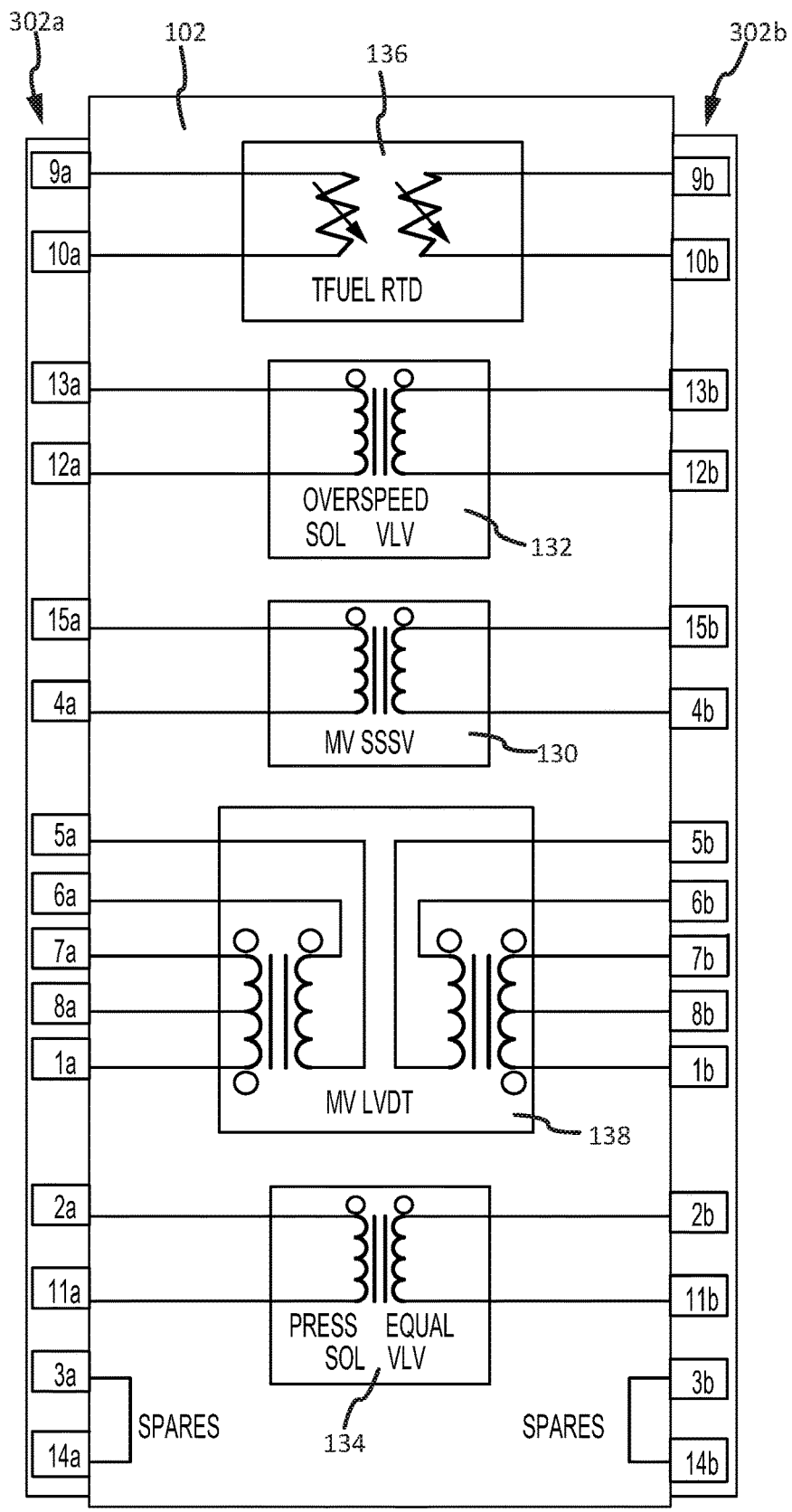
FIG. 3 illustrates a schematic of an input/output pin interface of an integrated fuel pump and control (IFPC), in accordance with various embodiments.

With reference to FIG. 3, a schematic illustration of the input/output pins of IFPC 102 is shown, in accordance with various embodiments. A first pin interface 302a of IFPC 102 may comprise pins that convey electrical signals into or out of IFPC 102. In various embodiments, IFPC 102 may comprise a first fifteen pin input/output interface 302a, and a second fifteen pin input/output interface 302b. The pin configuration of second input/output pin interface 302b may be identical to the pin configuration of first pin interface 302a, such that second pin interface 302b may provide a redundancy. In that regard, switch box 202 (FIG. 2) may be compatible with both first pin interface 302a and second pin interface 302b. Stated another way, switch box 202 may be coupled to either first pin interface 302a or second pin interface 302b to actuate metering valve 130.

In various embodiments, pins 9a and 10a of first pin interface 302a and pins 9b and 10b of second pin interface 302b may be electrically coupled to RTD 136 of IFPC 102. Pins 13a and 12a of first pin interface 302a and pins 13b and 12b of second pin interface 302b may be electrically coupled to overspeed solenoid valve 132 of IFPC 102. Pins 15a and 4a of first pin interface 302a and pins 15b and 4b of second pin interface 302b may be electrically coupled to metering valve 130 of IFPC 102. Pins 5a, 6a, 7a, 8a, and 1a of first pin interface 302a and pins 5b, 6b, 7b, 8b, and 1b of second pin interface 302b may be electrically coupled to LVDT 138 of IFPC 102. Pins 2a and 11a of first pin interface 302a and pins 2b and 11b of second pin interface 302b may be electrically coupled to pressure equalization solenoid valve 134 of IFPC 102. Pins 3a and 14a of first pin interface 302a and pins 3b and 14b of second pin interface 302b may be extra pins which are not electrically coupled to any components of IFPC 102.

Figure 4A:
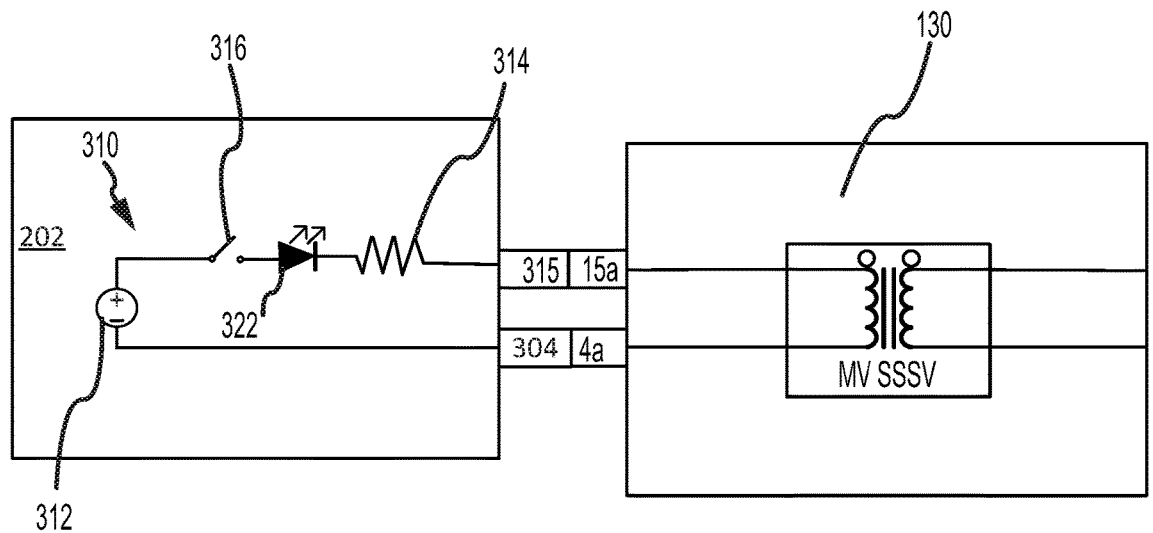
FIGS. 4A and 4B illustrate schematics of a switch box of a fuel preservation system coupled to a metering valve of an IFPC, in accordance with various embodiments.

With combined reference to FIG. 2 and FIG. 4A, during preservation of fuel system 100, a mating connector 330 electrically coupled to switch box 202 may engage first pin interface 302a of IFPC 102. Mating connector 330 may be electrically coupled to a circuit 310 of switch box 202 via a wire or cable 332. Mating connector 330 may include 15 pins configured to engage the 15 pins of first pin interface 302a or second pin interface 302b. In that regard, switch box 202 may be electrically coupled to IFPC 102 by connecting mating connector 330 to first pin interface 302a or second pin interface 302b. In various embodiments, only the pins engaged with pins 15a and 4a (or pins 15b and 4b) are electrically coupled to the circuitry within switch box 202. For example, pin 315 and pin 304 of mating connector 330 may engage to pin 15a and pin 4a, respectively, of first pin interface 302a, and may be electrically coupled to circuit 310.

With reference to FIG. 4A, circuit 310 may comprise a power supply 312, a switch 316, an indicator light 322, and a resistor 314. Switch 316 may be configured to open and close circuit 310. Resistor 314 may be coupled between the positive power supply terminal of power supply 312 and pin 315. Pin 304 may be coupled to the negative power supply terminal of power supply 312. Circuit 310 may generate a current configured to open the metering valve 130. In various embodiments, circuit 310 may generate a current between 10 milliamp and 50 milliamp. In various embodiments, circuit 310 may generate a current between 20 milliamp and 30 milliamp. For example, in various embodiments, resistor 314 may comprise a one kilo-ohm resistor and power supply 312 may comprise a 28 volt power supply.

With combined reference to FIG. 2 and FIG. 4A, switch box 202 may comprise a mechanical switch 320 coupled to switch 316 and configured to open and close circuit 310. In various embodiments, resistor 314 may comprise a potentiometer, and mechanical switch 320 may comprise a knob configured to vary the resistance of resistor 314. In various embodiments, switch box 202 may comprise the indicator light 322. Indicator light 322 may be configured to illuminate when circuit 310 is either open or closed. In various embodiments, indicator light 322 may provide visual indication to the user that the switch box 202 is turned on (i.e., that circuit 310 is closed and switch box 202 is generating a current) or that switch box 202 is turned off (i.e., that circuit 310 is open and switch box 202 is not generating a current). In various embodiments, indicator light 322 may comprise a light-emitting diode (LED). Switch box may be configured to be powered by an external power source (e.g., via a 120V 60 Hz AC supply) or by a battery included within switch box.

Figure 4B:
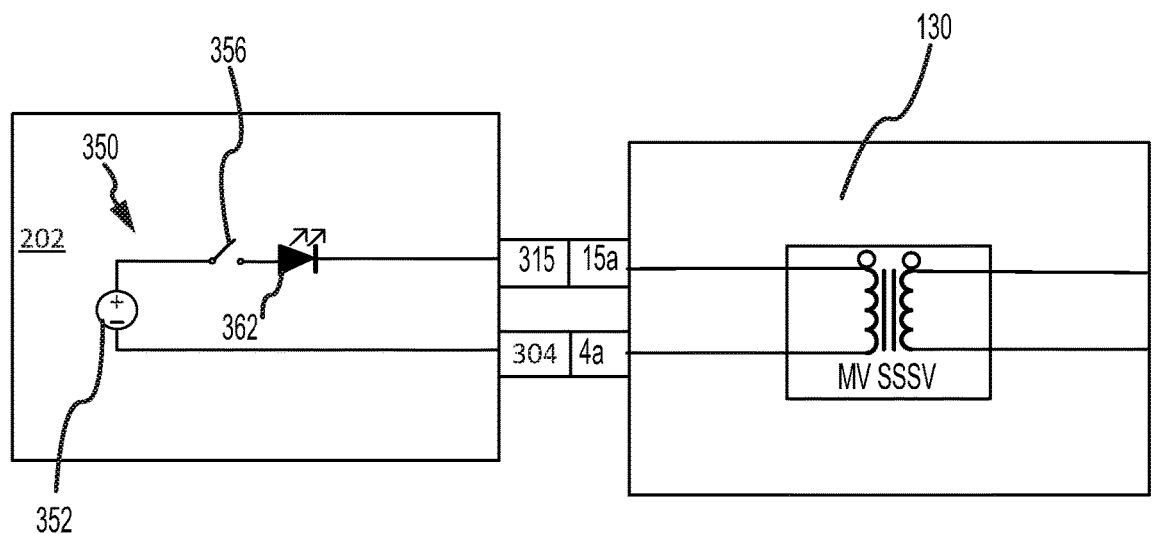

With reference to FIG. 4B, in various embodiments, switch box 202 may comprise a circuit 350. Circuit 350 may comprise a power supply 352, a switch 356, and an indicator light 362. Switch 356 may be configured to open and close circuit 350. The positive power supply terminal of power supply 352 may be coupled to pins 315 and 15a. Pins 304 and 4a may be coupled to the negative power supply terminal of power supply 352. Circuit 350 may supply a voltage to metering valve 130. The voltage supplied by circuit 350 may cause an actuation of metering valve 130. Stated another way, in various embodiments, metering valve 130 may be configured such that a voltage, as opposed to a current, will cause metering valve 130 to open and close. In various embodiments, with combined reference to FIG. 4B and FIG. 3, the voltage supplied by circuit 350 may cause metering valve 130 and solenoid valves 132 and 134 to open and close, which may allow preservation fluid to be supplied to the various components of fuel system 100 (FIG. 2).

Returning to FIG. 2, portable preservation system 200 may include a cart 204. Cart 204 may be portable such that cart 204 may be taken to an engine that has been removed from an aircraft. Switch box 202 may be coupled to cart 204. Cart 204 may include a driver 206 for injecting preservation fluid into fuel system 100. For example, driver 206 may inject the preservation fluid into an inlet 154 of IFPC 102 via conduit 156. Cart 204 including switch box 202 and driver 206 may form portable preservation system 200 which may be taken to engine 20 (FIG. 1). For example, the use of portable preservation system 200 may permit fuel system preservation to be conducted after removing engine 20 from an aircraft and without employing an engine test cell. In that regard, preservation may be conducted without supplying electrical power to be supplied to EEC 140 and/or without operating gas turbine engine 20. In various embodiments, switch box 202 and EEC 140 may both be coupled to IFPC 102 though only switch box 202 receives power and supplies voltage and/or current to IFPC 102. The current generated by switch box 202 of portable preservation system 200 may create a magnetic field that actuates the torque motor of metering valve 130, which may actuate solenoid valves 132 and 134. Stated another way, the current generated by switch box 202 may cause metering valve 130 and solenoid valves 132 and 134 to open and permit the preservation fluid from driver 206 to flow through fuel system 100.

Figure 5:
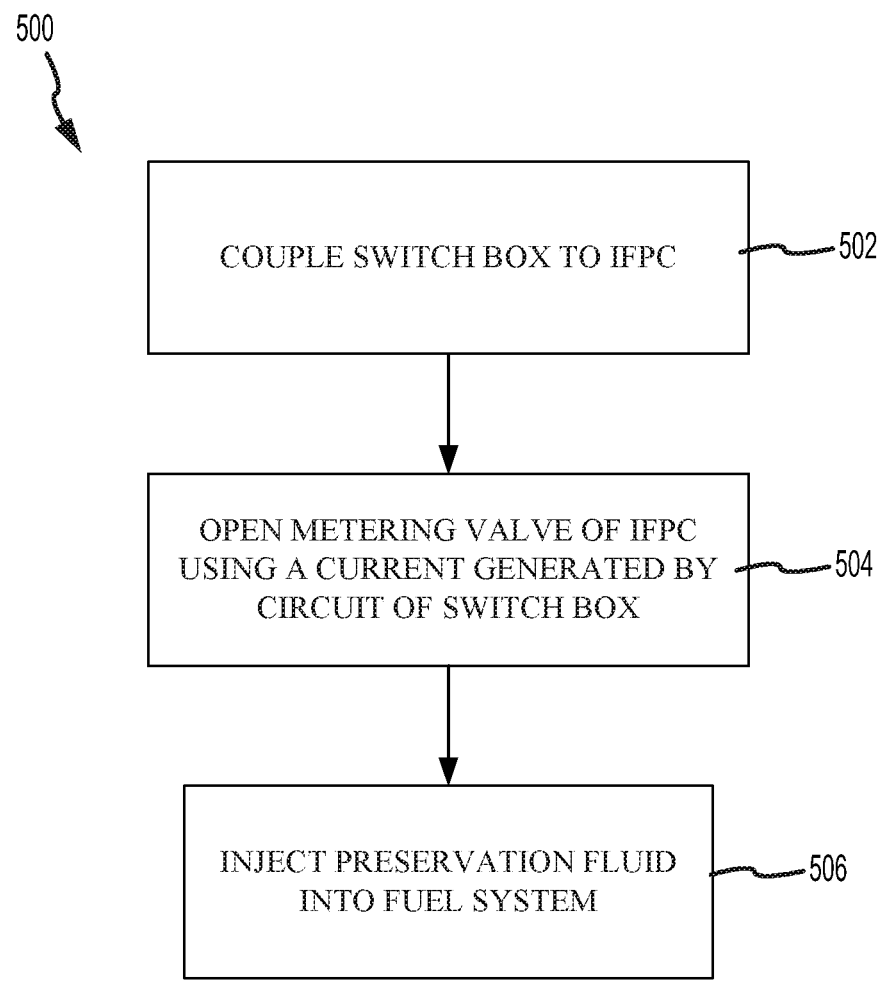
FIG. 5 illustrates a method of preserving a fuel system of a gas turbine engine, in accordance with various embodiments.

With reference to FIG. 5, a method 500 of preserving a fuel system of a gas turbine engine is disclosed, in accordance with various embodiments. Method 500 may comprise coupling a switch box of a portable fuel preservation system to an integrated fuel pump and control of the gas turbine engine (step 502), opening a metering valve of the integrated fuel pump and control using a current generated by closing a circuit of the switch box (step 504), and injecting a preservation fluid into the fuel system (step 506). In various embodiments, coupling the switch box to the integrated fuel pump and control may comprise engaging a mating connector coupled to the switch box with a pin interface of the integrated fuel pump and control, and wherein a first pin of the mating connector is electrically coupled to the circuit. The circuit may comprise a power supply electrically coupled to the first pin of the mating connector. The first pin of the mating connector may be configured to engage a second pin of the pin interface. The second pin may be electrically connected to the metering valve of the integrated fuel pump. A resistor may be coupled between the power supply and the first pin. The resistor may comprise a one kilo-ohm resistor. The current generated by closing the circuit of the switch box may be between 10 milliamp and 50 milliamp. Opening the metering valve may cause a first solenoid valve and a second solenoid valve of the integrated fuel pump and control to open.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A switch box for opening and closing a metering valve, a first solenoid valve, and a second solenoid valve of an integrated fuel pump and control during preservation of a fuel system, comprising:
    a mating connector configured to engage a pin interface of the integrated fuel pump and control, the mating connector comprising a first pin and a second pin; and
    a circuit electrically coupled to the mating connector, the circuit comprising:
        a power supply electrically coupled to the first pin of the mating connector and electrically isolated from the second pin of the mating connector, wherein the first pin of the mating connector is configured to engage a third pin of the pin interface, the third pin being electrically connected to the metering valve of the integrated fuel pump and control, and wherein the second pin is configured to engage a fourth pin of the pin interface, the fourth pin being electrically coupled to the first solenoid valve; and
        a resistor coupled between the power supply and the first pin, wherein the circuit is configured to generate a current that opens the metering valve, the first solenoid valve, and the second solenoid valve of the integrated fuel pump and control at the same time.

2. The switch box of claim 1, wherein the resistor comprises a one kilo-ohm resistor.

3. The switch box of claim 2, wherein the power supply comprises a 28 volt power supply.

4. The switch box of claim 1, further comprising a mechanical switch configured to open and close the circuit.

5. The switch box of claim 4, further comprising an indicator light configured to illuminate when the circuit is at least one of open or closed.

6. The switch box of claim 1, wherein the power supply and the resistor generate between a 10 milliamp and 50 milliamp current.

7. The switch box of claim 1, wherein the resistor comprises a potentiometer.

8. A portable fuel preservation system, comprising:
    a switch box for opening and closing a metering valve, a first solenoid valve, and a second solenoid valve of an integrated fuel pump and control of a gas turbine engine, the switch box including:
        a mating connector configured to engage a pin interface of the integrated fuel pump and control, the mating connector comprising a first pin and a second pin; and
        a circuit electrically coupled to the mating connector, the circuit comprising a power supply electrically coupled to the first pin of the mating connector and electrically isolated from the second pin of the mating connector, wherein the first pin of the mating connector is configured to engage a third pin of the pin interface, and the third pin being electrically connected to the metering valve of the integrated fuel pump, and wherein the second pin is configured to engage a fourth pin of the pin interface, the fourth pin being electrically coupled to the first solenoid valve, and wherein the circuit is configured to generate a current that opens the metering valve of the integrated fuel pump and control, the first solenoid valve of the integrated fuel pump and control, and the second solenoid valve of the integrated fuel pump and control at the same time; and
    a driver configured to inject preservation fluid into the integrated fuel pump and control;
    wherein the integrated fuel pump and control is configured to receive commands from an electronic engine controller, and wherein the electronic engine controller and the switch box can be coupled to the integrated fuel pump and control at the same time.

9. The portable fuel preservation system of claim 8, wherein the circuit further comprises a resistor coupled between the power supply and the first pin.

10. The portable fuel preservation system of claim 9, wherein the current is between 10 milliamp and 50 milliamp.

11. The portable fuel preservation system of claim 9, wherein the resistor comprises a one kilo-ohm resistor.

12. The portable fuel preservation system of claim 8, wherein the circuit supplies a voltage configured to actuate the metering valve.

13. The portable fuel preservation system of claim 8, wherein the switch box further comprises an indicator light configured to illuminate when the circuit is at least one of open or closed.

* * * * *